United States Patent [19]

Nagashima et al.

[11] Patent Number: 4,482,187
[45] Date of Patent: Nov. 13, 1984

[54] BELT GUIDE STRUCTURE

[75] Inventors: Hideyuki Nagashima; Hiroo Okuyama, both of Yokohama, Japan

[73] Assignee: Nissan Motor Co., Ltd., Japan

[21] Appl. No.: 384,676

[22] Filed: Jun. 2, 1982

[30] Foreign Application Priority Data

Jun. 12, 1981 [JP] Japan .............. 56-85475[U]

[51] Int. Cl.³ .......................................... B60R 21/10
[52] U.S. Cl. .................... 297/468; 297/483; 297/485
[58] Field of Search .......... 24/265 R, 265 A, 265 AL, 24/140, 146, 115 A, 121, 3 E, 20, 67, 67.3, DIG. 9; 224/226, 228, 236, 237, 246, 252; 2/338, 271; 297/468, 477, 485, 483; 280/801, 808

[56] References Cited

U.S. PATENT DOCUMENTS

| | | | |
|---|---|---|---|
| 1,722,551 | 7/1929 | Zadek | 24/DIG. 9 |
| 2,566,837 | 9/1951 | Huelmeyer | 24/67 R |
| 3,175,862 | 3/1965 | Robbins | 24/265 AL |
| 3,239,903 | 3/1966 | Steinberg | 24/146 |
| 3,244,452 | 4/1966 | Veley et al. | 280/744 |
| 3,267,546 | 8/1966 | Kraft | 24/67.3 X |
| 3,789,431 | 2/1979 | Rand | 2/271 X |
| 3,856,351 | 12/1974 | Garvey | 297/483 |
| 4,083,602 | 4/1978 | Mori et al. | 280/744 |

FOREIGN PATENT DOCUMENTS 2260569 6/1974 Fed. Rep. of Germany .
2330210 1/1975 Fed. Rep. of Germany .

*Primary Examiner*—James T. McCall
*Attorney, Agent, or Firm*—Leydig, Voit, Osann, Mayer and Holt, Ltd.

[57] ABSTRACT

A belt guide comprises a root portion secured on a base plate and an arm portion extending from the root portion to form a guide space between the arm and the base plate for receiving a safety belt. The arm portion has at its free end an inturned tongue turning toward the root portion. The inturned tongue is maintained in contact with the base plate. The belt guide permits entrance of the safety belt into the guide space under a force to cause the inturned tongue to lift off the base plate but prevents the safety belt from lifting the inturned tongue off the base plate to escape from the guide space.

16 Claims, 9 Drawing Figures

BELT GUIDE STRUCTURE

BACKGROUND OF THE INVENTION

This invention relates to a belt guide structure for guiding a safety belt used to restrain a passenger in place on a vehicle seat.

Belt guide structures have been provided for use in guiding safety belts movable between positions of passenger restraint and passenger release. Exemplary belt guide structures have a belt guide which comprises a root portion secured on a base plate and an arm portion extending from the root portion to form a guide space between the arm portion and the base plate for receiving the safety belt. The arm portion is formed at its free end with an extension turning toward the base plate to provide between the extension and the base plate a narrow gap which is of a distance to permit entrance of the safety belt into the guide space.

With such conventional belt guide structures, however, the possibility exists that the safety belt may escape through the narrow gap from the guide space and move away from the passenger, resulting in a failure to restrain the passenger on the vehicle seat in the event of a sudden deceleration of the vehicle.

Therefore, the present invention provides an improved belt guide structure which can eliminate the possibility of a safety belt from escaping from the belt guide and which can insure that a good restraint is maintained for a passenger seated on a vehicle seat.

SUMMARY OF THE INVENTION

According to the present invention, there is provided a belt guide structure for guiding a safety belt of a width suitable to restrain a passenger on a vehicle seat. The belt guide structure comprises a base plate and a belt guide. The belt guide includes a root portion secured on the base plate, and an arm portion extending from the root portion to form a guide space for receiving the safety belt between the arm portion and the base plate. The arm portion has at its free end an inturned tongue turning toward the root portion. The inturned tongue is maintained in contact with the base plate so as to permit entrance of the safety belt into the guide space under a force to cause the inturned tongue to lift off the base plate but prevent the safety belt from lifting the inturned tongue off the base plate to escape from the guide space.

The inturned tongue has a length to provide a distance between the inturned tongue and the root portion, the distance being shorter than the safety belt. The safety belt remains overlying the inturned tongue within the guide space so that the safety belt cannot lift the inturned tongue off the base plate and cannot escape from the guide space.

Preferably, the base plate is formed with a depression to provide a shoulder adapted to form an end contact with a tip end of the inturned tongue. This structure is effective to prevent the safety belt from lifting the inturned tongue off the base plate to escape from the guide space and also to minimize safety belt local wear caused by frictional motions of the safety belt with respect to the edge of the inturned tongue.

BRIEF DESCRIPTION OF THE DRAWINGS

The following description of the present invention is had in conjunction with the accompanying drawings, in which like reference numerals refer to the same or corresponding parts, and wherein.

DESCRIPTION OF THE PREFERRED EMBODIMENTS

Figure 1:
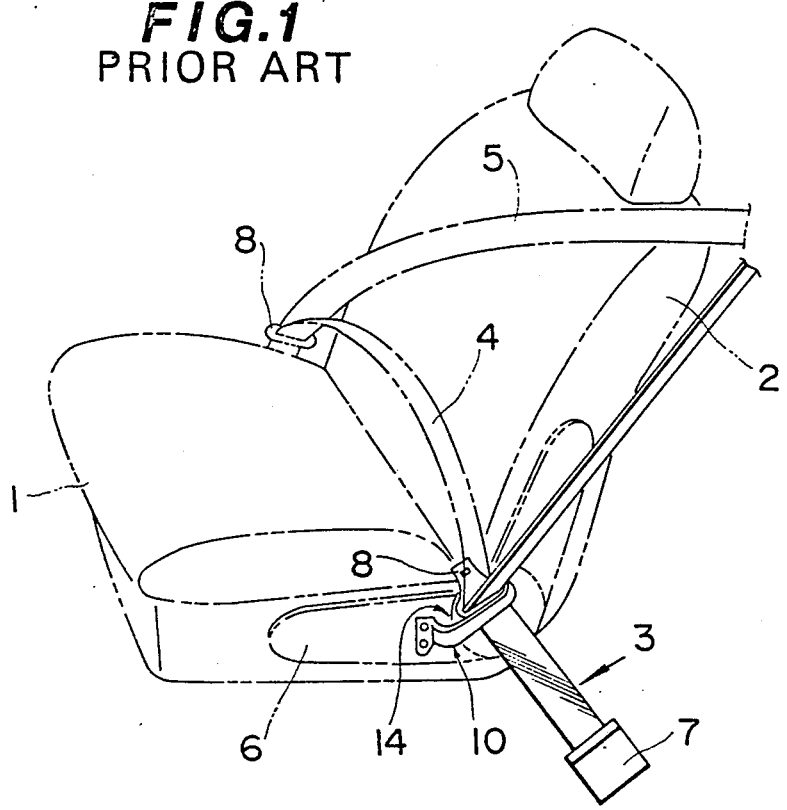
FIG. 1 is a perspective view showing a conventional belt guide structure.
Figure 2:
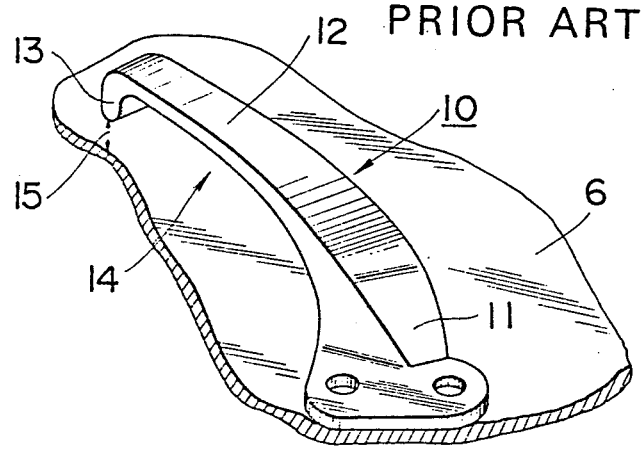
FIG. 2 is a fragmentary enlarged perspective view showing the belt guide structure of FIG. 1.

Prior to the description of the preferred embodiments of the present invention, we shall briefly describe the prior art belt guide structure in FIGS. 1 and 2 in order to specifically point out the difficulties attendant thereon.

Referring to FIGS. 1 and 2, the conventional belt guide, indicated generally at 10, is illustrated in association with an exemplary safety belt installation for a vehicle seat 1. The safety belt installation comprises a safety belt 3 anchored at its upper end to an anchor mounted on an upper portion of a vehicle interior (not shown). The opposite end of the safety belt 3 passes through the belt guide 10, secured on a base plate 6 mounted on an outboard side of the vehicle seat 1, to a safety belt retractor 7 which winds and unwinds the safety belt. The belt retractor 7 may be mounted on a vehicle floor or a lower portion of the vehicle interior somewhere outboard of the vehicle seat 1. A tongue plate 8 is secured on the safety belt 3 midway between the opposite ends of the safety belt so that it abuts on one side of the belt guide 10 away from the belt retractor 7 when the safety belt 3 is at its passenger release position, as is indicated in actual line. To restrain a passenger on the vehicle seat 1, the tongue plate 8 may be pulled to extend the safety belt 3 from the belt retractor 7 while the belt guide 10 guiding the safety belt 3, and inserted into a buckle means (not shown) anchored on a vehicle floor inboard of the vehicle seat 1. In such a passenger restraint position, as is indicated in phantom line, the seat belt 3 restrains the passenger's lower body portion by its lap belt portion 4 and also the passenger's upper portion by its diagonal torso belt portion 5 to insure good buckling for the passenger seated on the vehicle seat 1.

The belt guide 10 has a root portion 11 attached on the base plate 6 and an arm portion 12 extending from the root portion 11 to form a small guide space 14 between the arm portion 12 and the base plate 6. The belt guide root portion 11 is attached on the base plate 6 by means of clamp screws so that the arm portion 12 extends upward and rearward as illustrated. The arm portion 12 is turned at its free end toward the base plate 6 to provide a narrow gap 15 along with the base plate 6. The narrow gap 15 has a distance slightly larger than the thickness of the safety belt 3 so as to facilitate insertion of the safety belt 3 into the guide space 15.

However, such a conventional belt guide structure has been found to be insufficient to insure that a good restraint is maintained for a passenger seated on the vehicle seat. The safety belt may escape from the guide space through the gap 15 particularly when the vehicle seat back 2 is reclined and the passenger's upper body portion is inclined rearwardly.

Figure 3:
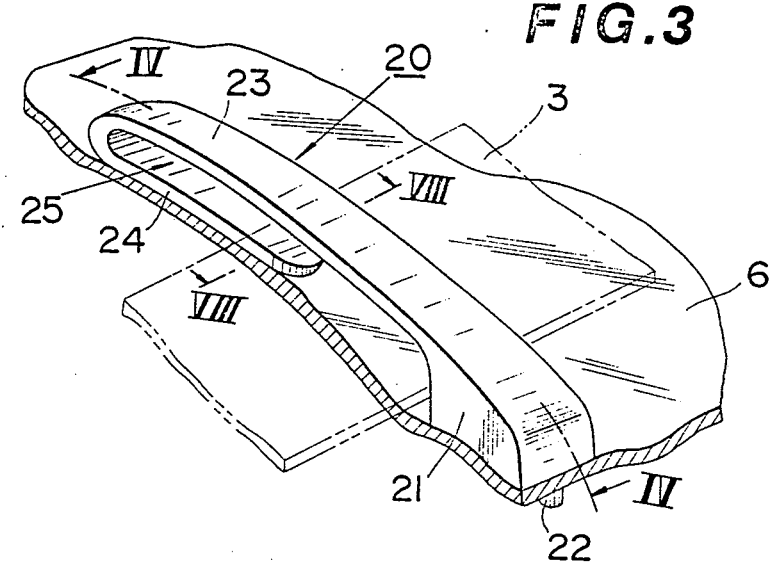
FIG. 3 is a fragmentary perspective view showing one embodiment of a belt guide structure made in accordance with the present invention.
Figure 4:
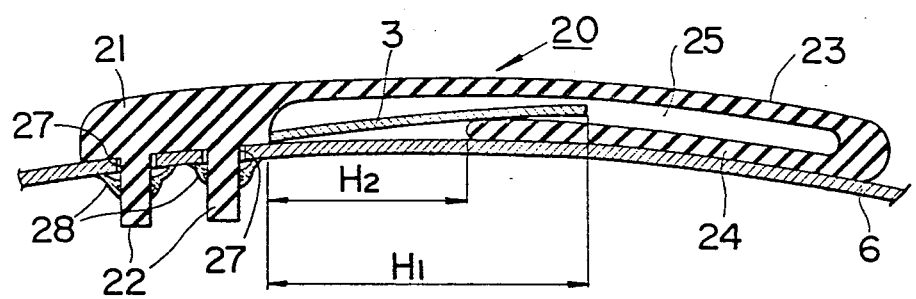
FIG. 4 is a longitudinal sectional view taken along the lines IV—IV of FIG. 3.

Referring now to FIGS. 3 and 4, there is illustrated one embodiment of a belt guide structure made in accordance with the present invention. The belt guide, indicated generally at 20, comprises a root portion 21 secured on the base plate 6 and an arm portion 23 extending from the root portion 21 to form a guide space 25 between the arm portion 23 and the base plate 6. The arm portion 23 is of a thickness to provide resilient spring properties. The guide space 25 has a length longer than the width H1 of the safety belt 3 (or the lap belt portion 4) for receiving the safety belt. The arm portion 23 is provided at its free end with an integral inturned resilient tongue 24 which turns at an angle of substantially 180 degrees with respect to the arm portion 23 and extends toward the root portion 21 along the base plate 6. Preferably, the angle made by the arm portion 23 and the inturned tongue 24 is greater than 180 degrees before the belt guide 20 is mounted on the base plate so that the inturned tongue 24 can be maintained in resilient contact with the base plate 6. The inturned tongue 24 is of a length to provide a distance H2 between the inturned tongue tip end and the root portion 21. The distance H2 is smaller than the width H1 of the safety belt 3 so that the safety belt 3 remains overlying the inturned tongue 24 within the guide space 25 as illustrated.

The root portion 21 has on its rear surface pins 22 which are inserted through holes 27 formed in the base plate 6 and are secured on the rear surface of the base plate 6 by means of snap rings 28 or any suitable means. The belt guide 20 is secured on the base plate 6 such that the arm portion tip end faces upward and rearward. The number of the pins 22 may be reduced to one by providing a depression which receives or engages the belt guide root portion 21 to resist efforts to rotate the belt guide 20.

The safety belt 3 may be slipped against a resilient force between the inturned tongue 24 and the base plate 6 into the guide space 25 defined by the root portion 21, the arm portion 23, the inturned tongue 24, and the base plate 6. Since the safety belt 3 remains overlying the inturned tongue 24 when placed within the guide space 25, the safety belt cannot lift the inturned tongue 24 off the base plate 6 to escape from the guide space 25.

Figure 5:
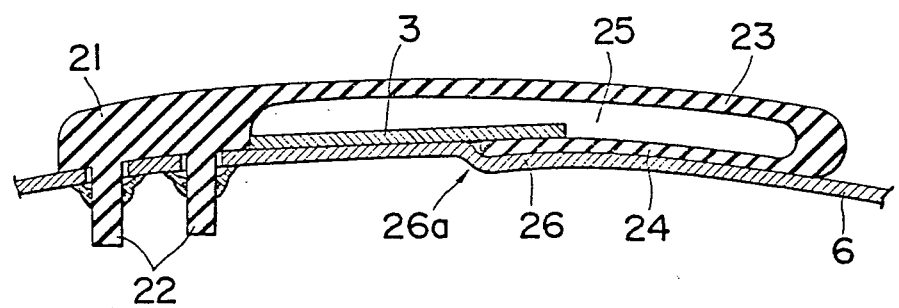
FIG. 5 is a longitudinal sectional view showing a second embodiment of the present invention.

Referring to FIG. 5, there is shown a second embodiment which differs from the first embodiment only in that the base plate 6 is formed with a depression 26 which receives the inturned tongue 24 or provides a shoulder 26a adapted to form an end contact with the tip end of the inturned tongue 24 so that the upper surfaces of the base plate 6 and the inturned tongue 24 are generally co-planar or in aligned relationship. The safety belt 3 remains overlying the inturned tongue 24 as illustrated so that the safety belt 3 cannot lift the inturned tongue 24 off the base plate 6 and escape from the guide space 25. This embodiment can minimize safety belt local wear caused by frictional motions of the safety belt with respect to the edge of the inturned tongue 24 to provide long useful safety belt life.

Figure 6:
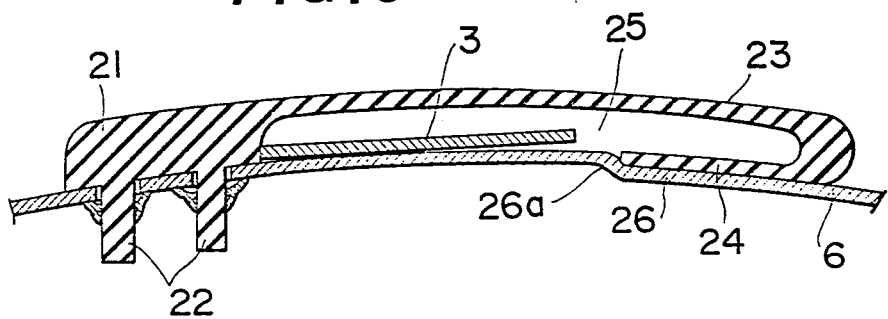
FIG. 6 is a longitudinal sectional view showing a third embodiment of the present invention.

Referring to FIG. 6, there is shown a third embodiment of the present invention which is generally the same as shown in FIG. 5 except that the inturned tongue 24 is shortened so that the safety belt 3 is placed on the base plate 6 without overlying the inturned tongue 24 when one side of the safety belt 3 is near or in contact with the root portion 21 as illustrated. The base plate 6 is formed with a depression 26 which receives the inturned tongue 24 or provides a shoulder 26a adapted to form an end contact with the tip end of the inturned tongue 24. The upper surface of the inturned tongue 24 is generally co-planar or in aligned relationship with that of the base plate so that the safety belt 3 cannot lift the inturned tongue 24 off the base plate 6 to escape from the guide space 25 and also can minimize safety belt wear due to frictional motions of the safety belt with respect to the edge of the inturned tongue 24.

Figure 7:
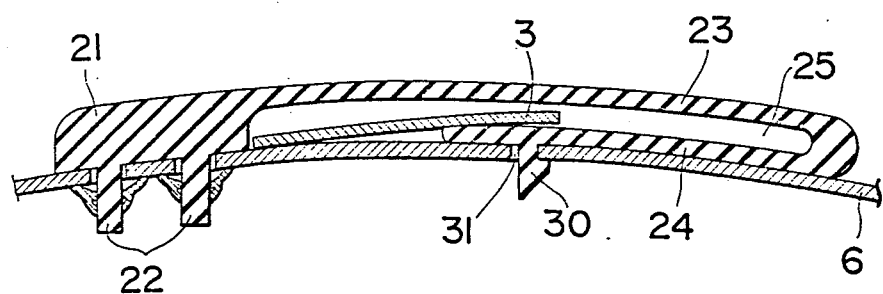
FIG. 7 is a longitudinal sectional view showing a fourth embodiment of the present invention.

Referring to FIG. 7, there is shown a fourth embodiment of the present invention which differs from the first embodiment of FIGS. 3 and 4 only in that the inturned tongue 24 is formed on its outer surface with an integral outwardly extending lance 30 which is of a shape to extend into and engage with an aperture 31 formed in the base plate 6. To enter the safety belt 3 into the guide space 25, a force may be exerted on the free end of the arm portion 23 to push it toward the root portion 21 and deform the resilient arm portion 23 so as to cause the lance 30 to escape from the aperture 31 and the inturned tongue 24 to lift off the base plate 6. After the safety belt 3 enters the guide space 25, the force is released to return the arm portion 23 to its initial position where the lance 30 is placed in the aperture 31 to insure that the resilient inturned tongue 24 is maintained in contact with the base plate 6 and to prevent the belt guide 20 from rotating or shifting so as to insure good belt guiding performance. It is to be understood, of course, that such a lance 30 may be used also in the belt guides of the second and third embodiments.

Figure 8:
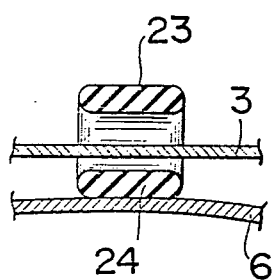
FIG. 8 is a transverse sectional view taken along the lines VIII—VIII of FIG. 1.
Figure 9:
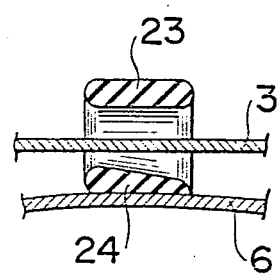
FIG. 9 is a transverse sectional view showing a modification of the first to fourth embodiments of the present invention.

The inturned tongue 24 may be formed such that its upper and lower surfaces extend generally in parallel with each other, as shown in FIG. 8. Alternatively, the inturned tongue upper surface may be inclined to taper the sectional area of the inturned tongue 24 toward its one side near the belt retractor 7, as shown in FIG. 9. This arrangement is effective to permit the tongue plate 8 to seat more fittingly on the belt guide 20 when the safety belt 3 is in its passenger release position.

Although the belt guide of the present invention has been shown and described as being mounted on the lower portion of a vehicle seat, it is to be understood that it may be mounted on a vehicle interior or other desired place dependent on the use aspect.

There has been provided, in accordance with the present invention, an improved belt guide structure which can insure that a good restraint is maintained for a passenger seated on a vehicle seat without the possibility of the safety belt from escaping from the belt guide. While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A belt guide structure for guiding a safety belt of a width suitable to restrain a passenger on a vehicle seat, comprising:
   a base plate; and
   a belt guide including:
   a root portion secured on said base plate; and
   an arm portion extending from said root portion to form a guide space for receiving said safety belt between said arm portion and said base plate, said arm portion having at its free end an inturned tongue turning toward said root portion, said inturned tongue being maintained in contact with said base plate so as to permit entrance of said safety belt into said guide space under a force to cause said inturned tongue to lift off said base plate but prevent said safety belt from lifting said inturned tongue off said base plate to escape from said guide space.

2. A belt guide structure as claimed in claim 1, wherein said inturned tongue has a length to provide a distance between said inturned tongue and said root portion, said distance being shorter than the width of said safety belt so that said safety belt remains overlying said inturned tongue within said guide space.

3. A belt guide structure as claimed in claim 2, wherein said inturned tongue is formed on its outer surface with an outwardly extending lance for entering an aperture formed in said base plate, said lance being removable from said aperture by bending said belt guide.

4. A belt guide structure as claimed in claim 1, wherein said inturned tongue has a length to provide a distance between said inturned tongue and said root portion, said distance being longer than the width of said safety belt.

5. A belt guide structure as claimed in claim 1, wherein said inturned tongue is formed on its outer surface with an outwardly extending lance for entering an aperture formed in said base plate, said lance being removable from said aperture by bending said belt guide.

6. A belt guide structure for guiding a safety belt of a width suitable to restrain a passenger on a vehicle seat, comprising:
   (a) a base plate; and
   (b) a belt guide including:
   a root portion secured on said base plate;
   an arm portion extending from said root portion to form a guide space for receiving said safety belt between said arm portion and said base plate, said arm portion having at its free end an inturned tongue turning toward said root portion;
   said inturned tongue being maintained in contact with said base plate so as to permit entrance of said safety belt into said guide space under a force to cause said inturned tongue to lift off said base plate but prevent said safety belt from lifting said inturned tongue off said base plate to escape from said guide space, said inturned tongue having a length to provide a distance beween said inturned tongue and said root portion, said distance being shorter than the width of said safety belt so that said safety belt remains overlying said inturned tongue within said guide space; and
   said base plate being formed with a depression to provide a shoulder adapted to form an end contact with a tip end of said inturned tongue.

7. A belt guide structure as claimed in claim 6, wherein said inturned tongue is formed on its outer surface with an outwardly extending lance for entering an aperture formed in said base plate, said lance being removable from said aperture by bending said belt guide.

8. A belt guide structure for guiding a safety belt of a width suitable to restrain a passenger on a vehicle seat, comprising:
   (a) a base plate; and
   (b) a belt guide including:
   a root portion secured on said base plate;
   an arm portion extending from said root portion to form a guide space for receiving said safety belt between said arm portion and said base plate, said arm portion having at its free end an inturned tongue turning toward said root portion;
   said inturned tongue being maintained in contact with said base plate so as to permit entrance of said safety belt into said guide space under a force to cause said inturned tongue to lift off said base plate but prevent said safety belt from lifting said inturned tongue off said base plate to escape from said guide space, said inturned tongue having a length to provide a distance between said inturned tongue and said root portion, said distance being longer than the width of said safety belt; and
   said base plate being formed with a depression to provide a shoulder adapted to form an end contact with a tip end of said inturned tongue.

9. A belt guide member for guiding a safety belt of a width suitable to restrain a passenger on a vehicle seat, comprising:
   (a) a root portion secured on a base plate;
   (b) an arm portion extending from said root portion in spaced relation to said base plate;
   (c) a tongue portion extending along said base plate toward said root portion in spaced relation to said arm portion;
   (d) a turned connection portion connecting said tongue portion to said arm portion to maintain said tongue portion in resilient contact with said base plate; and
   (e) said belt guide member defining, together with said base plate, a closed loop to form therein a guide space for receiving said safety belt.

10. A belt guide member as claimed in claim 9, wherein said base plate is formed with a depression to provide a shoulder adapted to form an end contact with a tip end of said tongue portion.

11. A belt guide member as claimed in claim 9, wherein said tongue portion is formed on its outer surface with an outwardly extending lance for entering an aperture formed in said base plate, said lance being removable from said aperture by bending said belt guide member.

12. A belt guide member as claimed in claim 9, wherein said tongue portion has a length to provide a distance between said tongue portion and said root portion, said distance being shorter than the width of said safety belt so that said safety belt remains overlying said tongue portion within said guide space.

13. A belt guide member as claimed in claim 12, wherein said base plate is formed with a depression to provide a shoulder adapted to form an end contact with a tip end of said tongue portion.

14. A belt guide member as claimed in claim 9, wherein said tongue portion has a length to provide a distance between said tongue portion and said root portion, said distance being longer than the width of said safety belt.

15. A belt guide member as claimed in claim 14, wherein said base plate is formed with a depression to provide a shoulder adapted to form an end contact with a tip end of said tongue portion.

16. A belt guide member as claimed in claim 14, wherein said tongue portion is formed on its outer surface with an outwardly extending lance for entering an aperture formed in said base plate, said lance being removable from said aperture by bending said belt guide member.

* * * * *